United States Patent Office 3,575,756
Patented Apr. 20, 1971

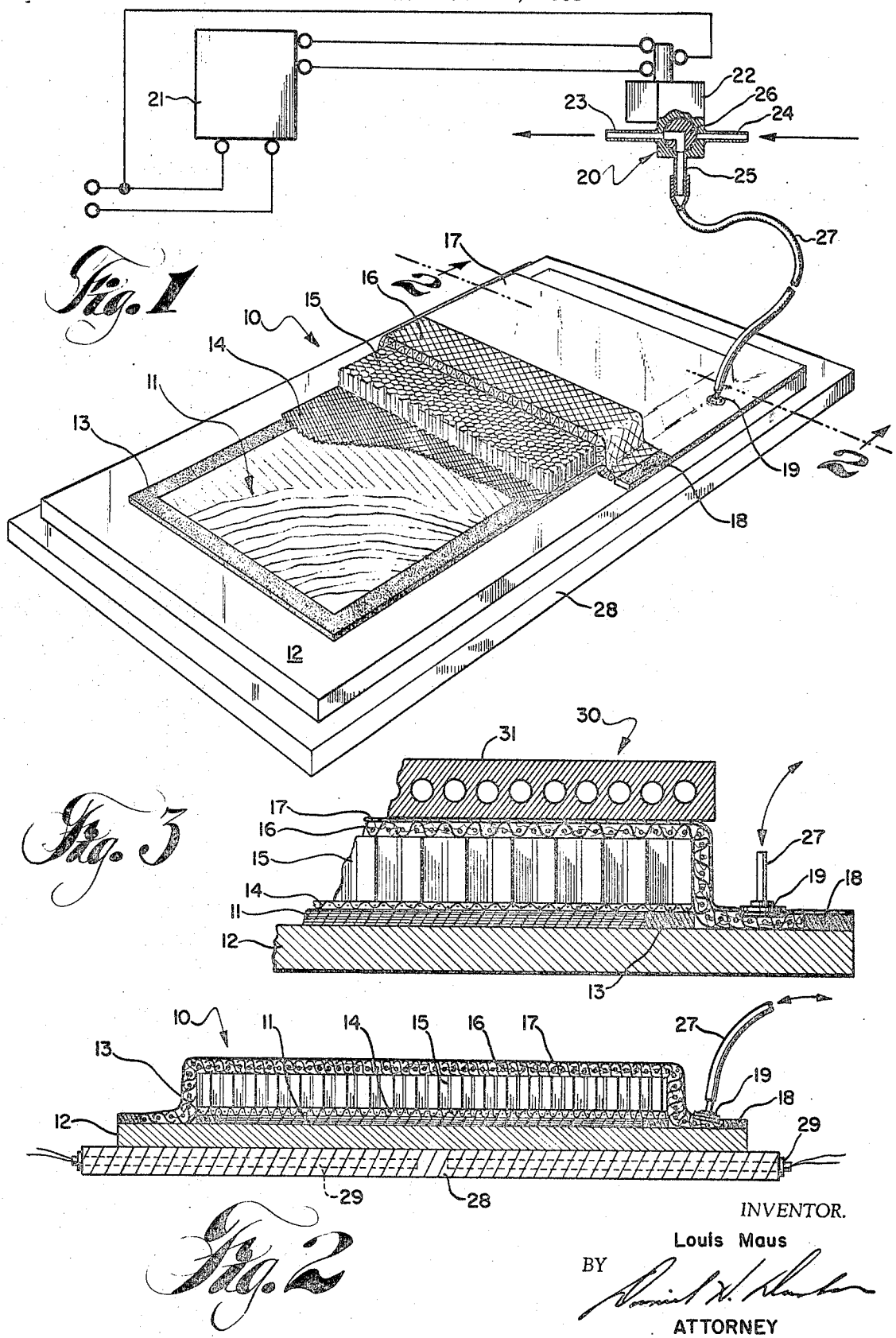

3,575,756
LAMINATED STRUCTURAL MEMBERS
Louis Maus, Tulsa, Okla., assignor to North American Rockwell Corporation
Filed Oct. 15, 1968, Ser. No. 767,756
Int. Cl. C03c 27/10; B23b 17/04
U.S. Cl. 156—103
7 Claims

ABSTRACT OF THE DISCLOSURE

Apparatus and methods are disclosed for vacuum-bag manufacture of thermosetting resin-impregnated fabric layers into forms suitable for structural member applications.

SUMMARY OF THE INVENTION

Layers of a fabric impregnated with uncured or partially-cured thermosetting resin, such as multiple plies of an epoxy, phenolic, or polyimide resin pre-impregnated glass fiber cloth, are cut to the required shape and are assembled on a base form within a zone that is defined by an edge dam element for lamination. Such edge dam element generally defines the edge of the desired laminated assembly and has a substantially corresponding thickness to minimize or prevent the flow of resin from the assembled layers during resin curing. A release element consisting of a ply of porous release fabric is positioned over the fabric layers, a compression element of expanded honeycomb core material or the like is placed in edge-contacting relation over the release element, a bleeder element of at least one ply of porous bleeder fabric is placed over the honeycomb core compression element, and the fabric layers and superimposed apparatus elements are then sealed within a conventional vacuum-bag membrane element in a normal manner. Lamination is accomplished by heating the assembled fabric layers to resin curing temperatures in a prescribed manner and by simultaneously pressure cycling the atmosphere environment within the vacuum-bag membrane element also in a prescribed manner, each until resin curing has been completed. In some instances a resin pool element consisting of an extra ply of resin-impregnated fabric is positioned between the release element and the compression element to provide a reservoir of resin during lamination processing. Curing may be accomplished by a heating element that contacts the base form in heat transfer relationship or by conventional oven apparatus.

DESCRIPTION OF THE DRAWINGS

FIG. 1 illustrates a preferred form of apparatus for practicing the instant invention;
FIG. 2 is a sectional view taken at line 2—2 of FIG. 1; and
FIG. 3 is a partial sectional view of an alternate apparatus embodiment.

DETAILED DESCRIPTION

FIG. 1 illustrates a preferred embodiment of apparatus 10 for practicing the instant invention to manufacture improved laminated structural members. Each element of the FIG. 1 illustration is separately described in the following subparagraphs by the applicable drawing reference numeral, element nomenclature, details of composition and form, and statement of function, respectively:

11; fabric layer assembly; comprised of the required number of indiivdual layers of thermosetting resin-impregnated fabric for the laminated structural member and typically consisting of multiple plies of woven glass fabric pre-impregnated with an epoxy, phenolic, or polyimide thermosetting resin; cured at elevated temperature to form desired laminated structural member;

12; base form; usually a metal or reinforced plastic, depending on whether subsequent heating is by a heater element or by oven apparatus, with an upper surface contoured to correspond to the surface contour of the laminated structural member and coated with a release agent; functions to support fabric layer assembly 11 and to conduct heat to the assembly at the assembly lowermost layer;

13; edge dam; preferably of zinc chromate tape adhesively secured to base form 12; functions to minimize or prevent resin flow from assembly 11 during lamination processing;

14; release element; preferably a ply of conventional compliant and porous release fabric (polytetrafluorethylene or silicone lyophobic agent-coated release cloth, for example) cut to cover, and positioned over, assembly 11; functions to assure separation of superimposed apparatus elements, together with the release element, from assembly 11 after lamination into the laminated structural member;

15; compression element; preferably comprised of expanded honeycomb core material, as for example expanded aluminum honeycomb core material of $3/16''$ cell size, 4 pounds per cubic foot density or nylon-impregnated paper honeycomb core material of $1/8''$ cell size, 2.3 pounds per cubic foot density, placed in edge contacting relation over release element 14; functions to compress assembly 11 at its upper layer along and throughout the line elements of a honeycomb network using relatively high edge pressures (e.g. 150 p.s.i. to 1500 p.s.i.) developed by cycling the apparatus interior environmental pressure to and from near-vacuum conditions during laminations processing and may also function as a multi-celled reservoir for free liquid resin under particular conditions of laminating processing;

16; bleeder element; preferably one or more plies of conventional woven bleeder fabric; assists in the removal and admission of gases from the interior-most portions of apparatus 10 during lamination processing;

17; vacuum-bag membrane; of conventional flexible polymeric composition in sheet form and of a size to completely cover elements 11 and 13 through 16; functions to isolate the environment vacuum pressures established at the apparatus interior during lamination processing from standard atmospheric environments at the apparatus exterior and also to develop the compression forces that act on assembly 11 through compression element 15;

18; seal; preferably zinc chromate tape adhesively secured to the upper surface of base form 12 and also to the peripheral undersurface of vacuum-bag membrane 17; functions to seal the interior of apparatus 10 at the edges of membrane 17 from exterior standard atmospheric pressure during the vacuum phase of lamination processing;

19; vacuum fitting; conventional flanged tube sealed in apparatus 10 at an opening in membrane 17; serves as part of the means that connects the interior of apparatus 10 to vacuum and standard atmospheric pressure conditions during lamination processing;

20; control system generally; essentially comprised of programmer and valve assembly means and cooperating vacuum and standard atmospheric pressure sources; cycles the pressure condition at the interior of apparatus 10 alternately between a vacuum pressure condition and a comparatively higher pressure condition such as atmospheric pressure in a prescribed manner during lamination processing;

21; programmer; normally in the form of separate electrical switch means operated by a timing cam and synchronous motor arrangement on a conventional on/off basis; continuously produces one or the other of two separate control signal outputs that control the valving of either a vacuum or standard atmospheric pressure condition to the interior of apparatus 10, each for preselected periods of time as hereinafter described, during lamination processing;

22; valve assembly; preferably a solenoid-operated valve controller as to either of two operating conditions by programmer 21; responds to one control signal from programmer 21 to valve a vacuum pressure condition to the interior of apparatus 10 and responds to the other control signal from programmer 21 to valve a standard atmospheric pressure condition to the interior of apparatus 10;

23; valve port; normally in the form of a standard threaded connection to a cooperating rigid pressure-resistant line fitting; connects valve assembly 22 to a conventional vacuum pressure source (not shown);

24; valve port; normally a conventional valve connection open to the existing environment; connects valve assembly 22 to a standard atmospheric pressure source;

25; valve port; normally in the form of a standard threaded connection that cooperates with a conventional pressure-resistant line connection fitting; connects valve assembly 22 to that portion of apparatus 10 that includes vacuum-bag membrane 17;

26; valving element; normally a metal cylinder provided with a through alignment passageway and rotated between two alternate positions by the solenoid of valve assembly 22; functions at one position to connect valve port 23 to valve port 25 to establish a vacuum pressure condition at the interior of apparatus 10 and at the other position to connect valve port 24 to valve port 25 to establish a standard atmospheric pressure condition at the interior of apparatus 10, each during lamination processing;

27; pressure line; conventional non-collapsing hosing connected at one end to fitting 19 and at the other end to valve port 25; functions as a part of the means that connects the interior of apparatus 10 to valve assembly 22;

28; heater assembly; comprised of a metallic body and suitable heating elements; generates and transfers heat into base form 12 at a sufficient temperature for curing the thermosetting resin in assembly 10 during lamination processing;

29 (FIG. 2); resistance heating element; electrical resistance device of conventional rod form inserted into the body of heater assembly 28 and connected to an electrical power supply; functions to convert electrical energy received from the power supply to heat at a sufficient rate to accomplish curing of the thermosetting resin;

In addition to the foregoing elements, the apparatus of FIG. 1 may sometimes advantageously incorporate a resin pool element. Although not shown in the drawings, such resin pool element is in the form of one or more additional fabric layers impregnated with the same thermosetting resin as that of assembly 11 and positioned in the apparatus intermediate release element 14 and compression element 15. Such additional element during lamination processing provides an excess of thermosetting resin to assure an adequate quantity of that material and additionally cushions the underside edges of compression element 15 in a manner whereby there is a minimum embossing of the upper surface of the resulting laminated structural member with the corresponding pattern of a network of line elements. Cushioning may alternately be accomplished by use of a layer of wire screening at the underside of compression element 15.

As indicated above, the apparatus arrangement 10 of FIG. 1 utilizes heater assembly 28 for accomplishing resin curing during lamination processing. Other means for heating base form 12 to cure the thermosetting resin of assembly 11 may also be utilized in the practice of the instant invention and one suitable alternate apparatus arrangement for this purpose is disclosed by FIG. 3. In the FIG. 3 arrangement, which arrangement is intended for use with conventional oven apparatus to accomplish resin curing, a heat sink means 31 is positioned over vacuum-bag membrane 17 for the purpose of assuring a temperature differential across assembly 11 during lamination processing. In this regard it is important that resin curing be accomplished during lamination processing in a directional manner from the lowermost fabric layer of assembly 11 to the uppermost fabric layer. In some instances it is possible to eliminate the requirement for heat sink 31 even though heating is accomplished by conventional oven apparatus. In such instances, cycling room temperature air into the environment interior of vacuum-bag membrane 17 at a comparatively high frequency as hereinafter explained will function to positively establish the temperature differential that obtains the required resin curing directionality.

As previously indicated, it is important that lamination processing be accomplished in two critical manners. First, it is necessary in the practice of the instant invention that the thermosetting resin fraction of fabric layer assembly 11 be cured directionally from the region of the lowermost fabric layer to the region of the uppermost fabric layer. Such is essentially accomplished by heating the assembly to the prescribed resin curing temperature from adjacent such lowermost fabric layer. Second, it is necessary in the practice of this invention that the environment located interiorly of vacuum-bag membrane 17 and base form 12 and containing fabric layer assembly 11 be pressure-cycled during the period of directional resin curing alternately between vacuum and standard atmospheric (or comparably elevated) pressure conditions. The resin curing temperatures and times-at-temperature utilized are the standard cure temperatures and times for the thermosetting resin actually being laminated. Such are normally established and prescribed by the manufacturer or supplier of the resin system.

The time characteristics of the different pressure phases of the individual cycles that are continuously repeated during lamination processing in accordance with this invention may be varied. Individual pressure-varied cycles comprised of a 15 minute period of vacuum pressure condition followed by a 3 minute period of standard atmospheric pressure have been utilized in some instances. Individual cycles comprised of a 2 minute period of vacuum pressure condition followed by a ½ minute period of standard atmospheric pressure or even a higher frequency of ¼ minute period of vacuum pressure condition followed by a ¼ minute period of standard atmospheric pressure, on the other hand, are also advantageous as when lamination processing is to be accomplished in conventional oven means without employing a heat sink element such as 31 of FIG. 3.

The invention of this application has been utilized in connection with the lamination of different structural members employing glass fabric-reinforced phenolic, epoxy, and polyimide resin systems. Specific examples of such lamination processing, together with details of the improved structural properties that have been obtained, are as follows:

Example I

Thirteen plies of a Type 181 weave E-glass fiber fabric, each pre-impregnated with a commercially-available vacuum-bag grade phenolic resin system having a recommended standard cure of 2 hours at 170° F. followed by 1 hour at 200° F., 1 hour at 240° F., and 1 hour at 275° F., were laminated in accordance with this invention using apparatus substantially similar to that illustrated in FIG. 1. The apparatus environment containing the assembled fabric layers was pressure cycled throughout lamination processing utilizing continuously repeated individual pressure cycles comprised of 15 minutes vacuum phase at about 27″ Hg vacuum pressure followed by 3 minutes elevated pressure phase at ambient (1 atmosphere) pressure. The assembly was laminated using the standard temperature-time cure and was afterwards removed from the apparatus and post-cured at 400° F. for 2 hours. The resulting laminated structural member exhibited an edgewise compressive strength of 67,290 p.s.i., an edge modulus of $4.61 \times 10^{-6}$ p.s.i., and a density of 1.76 grams per cubic centimeter. Such properties are significantly increased over the edgewise compressive strength of 37,300 p.s.i., edge modulus of $3.03 \times 10^{-6}$ p.s.i., and density of 1.58 grams per cubic centimeter obtained in an identically constructed panel laminated using the same type of vacuum-bag apparatus but using a conventional steady state vacuum pressure of 27" of Hg throughout the standard cure, such identically constructed panel serving as a standard for comparison purposes. The reference panel was also subjected to the standard post-cure of 400° F. for 2 hours following removal from the conventional vacuum-bag apparatus and prior to testing.

Example II

Thirteen plies of a Type 181 weave E-glass fiber fabric, each pre-impregnated with a commercially-available vacuum-bag grade phenolic resin system having a recommended standard cure of 2 hours at 170° F. followed by 1 hour at 200° F., 1 hour at 240° F., and 1 hour at 275° F., were laminated in accordance with this invention using apparatus substantially similar to that illustrated in FIG. 1. The apparatus environment containing the assembled fabric layers was pressure cycled throughout lamination processing utilizing continuously repeated individual pressure cycles comprised of 2 minutes vacuum phase at about 27" Hg vacuum pressure followed by ½ minute elevated pressure phase at ambient (1 atmosphere) pressure. The assembly was laminated using the standard temperature-time cure and was afterwards removed from the apparatus and post-cured at 400° F. for 2 hours. The resulting laminated structural member exhibited an edgewise compressive strength of 63,530 p.s.i., an edge modulus of $4.61 \times 10^{-6}$ p.s.i., and a density of 1.79 grams per cubic centimeter. Such properties are significantly increased over the corresponding properties for the identically constructed reference panel described in detail in connection with Example I above.

Example III

Thirteen plies of a Type 181 weave E-glass fiber fabric, each pre-impregnated with a commercially-available vacuum-bag grade phenolic resin system having a recommended standard cure of 2 hours at 170° F. followed by 1 hour at 200° F., 1 hour at 240° F., and 1 hour at 275° F., were laminated in accordance with this invention using apparatus which was substantially similar to that illustrated in FIG. 1 and which incorporated a resin pool element consisting of an additional ply of the same resin-impregnated fabric positioned intermediate the release element and compression element components. The apparatus environment containing the assembled fabric layers was pressure cycled throughout lamination processing utilizing continuously repeated individual pressure cycles comprised of 2 minutes vacuum phase at about 27" of Hg vacuum pressure followed by ½ minute elevated pressure phase at ambient (1 atmosphere) pressure. The lamination was accomplished using a cure temperature of 170° F. for a period of 12 hours and was afterwards removed from the apparatus and post-cured at 400° F. for 2 hours. The resulting laminated structural member exhibited an edgewise compressive strength of 62,890 p.s.i., an edge modulus of $4.57 \times 10^{-6}$ p.s.i., and a density of 1.89 grams per cubic centimeter. Such properties are significantly increased over the edgewise compressive strength of 53,870 p.s.i., edge modulus of $3.65 \times 10^{-6}$ p.s.i., and density of 1.54 grams per cubic centimeter obtained in an identically constructed panel laminated using the same type of vacuum-bag apparatus but using a conventional steady state vacuum pressure of 27" of Hg throughout the 170° F., 12 hour standard cure cycle. Such identically constructed panel was fabricated as a standard for comparison purposes and was also subjected to the standard post-cure of 400° F. for 2 hours following removal from the vacuum-bag apparatus and prior to testing.

Example IV

Thirteen plies of a Type 181 weave E-glass fiber fabric, each pre-impregnated with a commercially-available vacuum-bag grade epoxy resin having a recommended standard cure of ½ hour at 180° F. followed by ½ hour at 225° F., 1 hour at 275° F., and 1 hour at 300° F., were laminated in accordance with this invention using apparatus substantially similar to that illustrated in FIG. 1. The apparatus environment containing the assembled fabric layers was pressure cycled throughout lamination processing utilizing continuously repeated individual pressure cycles comprised of 2 minutes vacuum phase at about 27" Hg vacuum pressure followed by ½ minute elevated pressure phase at ambient (1 atmosphere) pressure. The assembly was laminated using a temperature-time cure of 170° F. for 12 hours and was afterwards removed from the apparatus and post-cured at 300° F. for 2 hours. The resulting laminated structural member exhibited an edgewise compressive strength of 65,490 p.s.i., an edge modulus of $4.24 \times 10^{-6}$ p.s.i., and a density of 1.91 grams per cubic centimeter. Such properties are significantly increased over the edgewise compressive strength of 52,680 p.s.i., edge modulus of $3.56 \times 10^{-6}$ p.s.i., and density of 1.67 grams per cubic centimeter obtained in an identically constructed panel using conventional vacuum-bag and oven apparatus without a honeycomb core compression element and using a steady state vacuum pressure of 27" Hg vacuum throughout the standard temperature-time cure. Also, the inter-laminar shear strength of the improved panel was measured at 6,293 p.s.i. and is significantly increased over the corresponding 5,763 p.s.i. property for the identically constructed standard panel. The reference panel was also subjected to the standard post-cure of 300° F. for 2 hours following removal from the conventional vacuum-bag apparatus and prior to testing.

Example V

Thirteen plies of a Type 481 weave E-glass fiber fabric, each pre-impregnated with a commercially-available vacuum-bag grade polyimide resin system having a recommended standard cure of room temperature to 280° F. in 30 minutes followed by an increase to 310° F. in an additional 180 minutes, a rapid increase to 350° F., and a hold at 350° F. for 90 minutes, were laminated in accordance with this invention using apparatus substantially similar to that illustrated in FIG. 1. The apparatus environment containing the assembled fabric layers was pressure cycled throughout lamination processing using the continuously repeated individual pressure cycles detailed above in connection with Examples II, III, and IV. The assembly was laminated using a temperature-time cure of 240° F. for 12 hours and was afterwards removed from the apparatus and post-cured at 750° F. for 2 hours. The resulting laminated structural member exhibited an edgewise compressive strength of 82,380 p.s.i., an edge modulus of $4.81 \times 10^{-6}$ p.s.i., and a density of 1.93 grams per cubic centimeter. Such properties are significantly increased because of this invention over the edgewise compressive strength of 56,400 p.s.i., edge modulus of $3.49 \times 10^{-6}$ p.s.i. and density of 1.49 grams per cubic centimeter obtained in a reference panel constructed of 12 plies of the same fiber in a Type 181 weave with polyimide resin system impregnation using a conventional vacuum-bag and oven apparatus arrangement without a honeycomb core compression element and using a steady state vacuum pressure of 27" Hg vacuum throughout a standard cure cycle.

Example VI

A 13-ply panel similar in construction to the panel of Example V was laminated in accordance with the instant invention but using oven apparatus rather than a heater assembly. Also, room temperature air was used in connection with the vacuum/pressure cycling to maintain the required positive temperature differential rather than achieving the same effect by supplementary cooling with means such as heat sink element 31. Curing was accomplished at 215° F. over a period of 12 hours; vacuum/pressure cycles of 2 minutes at approximately 27" Hg vacuum followed by ½ minute at atmospheric pressure were employed throughout the period of curing. The resulting panel developed a density of 2.01 grams per cubic centimeter and an edgewise compressive strength of 68,000 p.s.i. to compare very favorably over the conventionally laminated reference panel.

I claim:
1. A method of manufacturing a fabric layer assembly impregnated with an uncured thermosetting resin system into a laminated structural member, and comprising the steps of:
   (a) containing a fabric layer assembly impregnated with an uncured thermosetting resin system in an environment having a vacuum pressure condition and simultaneously therewith contacting the upper surface of said fabric layer assembly with a compression force having a network distribution and derived from a high level compression pressure acting uniformly along joined line-like elements of a corresponding network throughout the extent of said upper surface;
   (b) then containing said fabric layer assembly in an environment having a pressure condition substantially greater than said vacuum pressure condition and simultaneously therewith contacting said fabric layer assembly upper surface with a compression force having said network distribution but derived from a compression pressure substantially lower than said high level compression pressure acting along said corresponding network joined line-like elements; and
   (c) frequently and continuously repeating steps (a) and (b) alternately during the heating of said fabric layer assembly directionally from a support side of said assembly opposite said upper surface to an elevated resin curing temperature until said uncured thermosetting resin system is cured.

2. The invention defined by claim 1, wherein cycles each comprised of steps (a) and (b) in sequence are continuously repeated at a rate of approximately from 3 to 120 complete cycles per hour in connection with step (c).

3. The invention defined by claim 1, wherein the ratio of the period of step (a) to the period of step (b) is in the range of from 1 to 6.

4. The invention defined by claim 1, wherein said step (a) compression force is derived from a high level compression pressure greater than approximately 150 p.s.i. acting at and along said corresponding network joined line-like elements.

5. The invention defined by claim 1, wherein said step (b) compression force is derived from a compression pressure of approximately 1,500 p.s.i. acting at and along said corresponding network joined line-like elements.

6. The invention defined by claim 2, wherein the ratio of the period of step (a) to the period of step (b) is in the range of from 1 to 6.

7. The invention defined by claim 4, wherein said step (b) compression force is derived from a compression pressure of approximately 1500 p.s.i. acting at and along said corresponding network joined line-like elements.

References Cited
UNITED STATES PATENTS

| | | | |
|---|---|---|---|
| 2,713,378 | 7/1955 | Nadler et al. | 156—286UX |
| 2,805,974 | 9/1957 | Brucker | 156—286X |

FOREIGN PATENTS

| | | | |
|---|---|---|---|
| 1,011,744 | 12/1965 | Great Britain | 156—286 |

CARL D. QUARFORTH, Primary Examiner

H. E. BEHREND, Assistant Examiner

U.S. Cl. X.R.

156—104, 286, 312, 382